United States Patent [19]
Materne et al.

[11] Patent Number: 5,699,895
[45] Date of Patent: Dec. 23, 1997

[54] SCRAPER FOR CHAIN BANDS OF DOUBLE-ENTER CHAIN SCRAPER CONVEYORS, ESPECIALLY IN UNDERGROUND MINING

[75] Inventors: Kurt André Materne, Iserlohn; Guenther Philipp, Schwerte; Wilhelm Muelle, Froendenberg, all of Germany

[73] Assignee: Thiele GmbH & Co. KG, Iserlohn, Germany

[21] Appl. No.: 610,702

[22] Filed: Mar. 4, 1996

[30] Foreign Application Priority Data

Mar. 25, 1995 [DE] Germany .................. 195 11 043.9

[51] Int. Cl.⁶ .................................................. B65G 19/24
[52] U.S. Cl. ............................................................ 198/731
[58] Field of Search .................................... 198/731, 733

[56] References Cited

U.S. PATENT DOCUMENTS 4,383,603  5/1983  Niemoller et al. ..................... 198/731

FOREIGN PATENT DOCUMENTS 0270702  12/1986  European Pat. Off. .
2359605   7/1973  Germany .
2759414   4/1977  Germany .
2905756   2/1979  Germany .
3535361  10/1985  Germany .
8705459  11/1987  Germany .
4027758   9/1990  Germany .

Primary Examiner—Joseph E. Valenza
Attorney, Agent, or Firm—Michael J. Striker

[57] ABSTRACT

In the scraper for chain bands of double-center chain scraper conveyors, the chain shackle is shaped in such a way in the direction of the scraper longitudinal axis that, during mounting with an inserted double-center chain, the chain shackle first comes to bear on those two legs of the horizontal chain links located towards the center of the scraper, in order, when the screw connection is tightened further, additionally to clamp the outer legs of the chain links. When a defined mounting force has been reached, the inner and outer chain-link legs are clamped with the same force. The concave curvature of the shackle, in contrast to the straight shackle, prevents the shackle from lifting off from the inner chain-link legs due to the bearing effect of the outer chain-link legs. An always uniformly distributed and permanently firm and reliable chain clamping is thereby guaranteed.

11 Claims, 2 Drawing Sheets

SCRAPER FOR CHAIN BANDS OF DOUBLE-ENTER CHAIN SCRAPER CONVEYORS, ESPECIALLY IN UNDERGROUND MINING

The present invention relates to a scraper for chain bands of double-center chain scraper conveyor, especially in underground mining.

Scrapers of this type for chain bands of double-center chain scraper conveyors, such as are used especially in underground mining are known from the German patent documents DE 3,535,361 A1, German Offenlegungsschrift 2,905,756, German Auslegeschrift 2,759,414 and EP 0,270, 702 A1. They are subject to very high mechanical stresses. Thus, it has been shown that the horizontal chain links clamped to the scraper body and located next to one another are subject to especially high wear if they are not clamped sufficiently firmly and permanently between the two scraper halves or between the scraper body and the chain shackle fastened to the latter by threaded bolts. In particular, a loosening of the chain links on the scraper as a result of high mechanical stresses during conveyance must also be counteracted.

Several solutions were proposed for preventing a loosening of the chain links. Some of such solutions are disclosed for example in German patent documents DE 4,027, 758 A1, German Offenlegungsschrift 2,359,605, and German Utility Model 8,705,459. In these documents the prevention of a loosening of the chain links is achieved by an additional third vertical screw between the chain links and, additionally in DE 4,027,758 A1, by a deformable bearing surface made of elastic material in the chain bed on the chin shackle. The bearing surface serves for preventing relative movements between the chain link or the chain links and the chain shackle. In the fastening device for the pusher of chain conveyors according to German Utility Model 8,705,459, the receiving space of the pusher for receiving the chain shackle is provided with a plastic coating and the chain shackle too is provided with a plastic sheathing.

SUMMARY OF THE INVENTION

Accordingly, it is an object of the present invention to provide a scraper for chain bands of double-center chain scraper conveyors, which avoids the disadvantages of the prior art.

More particularly, it is an object of the present invention to provide a scraper for chain bands which is formed in such a way that the horizontal chain links of the double-center chain used with the scraper are clamped on the scraper sufficiently firmly from the very outset and this clamp fastening between the chain links and scraper cannot come loose or release itself even under very high mechanical stresses both in the direction of run and transversely thereto.

In keeping with these objects and with others which will become apparent hereinafter, one feature of the present invention resides, briefly stated, in a scraper for chain bands in which the chain shackle is curved convexly relative to the scraper longitudinal axis, so that, during mounting with an inserted double center chain, the chain shackle first comes to bear on those two legs of the horizontal chain links located towards the center of the scraper, so that, when a defined mounting force has been achieved, the inner and outer legs of the chain links are clamped with approximately the same force. A chain clamping distributed uniformly over the two chain-link legs and therefore permanent is thus promoted, and, it may be said, guaranteed.

In accordance with the present invention it is advantageous that, during mounting with an inserted chain, the chain shackle first comes to bear on those longitudinal legs of the chain links located towards the center of the scraper, in order, when the screw connections are tightened further, additionally to clamp the outer legs of the chain links. When a defined mounting force has been achieved, the inner and outer chain-link legs are thus clamped with approximately the same force. The convex curvature of the shackle, in contrast to the straight shackle, prevents the shackle from lifting off from the inner chain-link legs due to the bearing effect of the outer chain-link legs. An always uniformly distributed and permanently firm and reliable chain clamping is thereby obtained.

In the region of clamping, the chain shackle is received with an exact fit in corresponding recesses in the scraper body, in order to introduce the horizontal forces occurring during operation into the scraper body itself and not into the screw connection of the chain shackle. This is achieved in an especially advantageous way in that the chain shackle is arranged with its two ends, in the region of the threaded bolts, in U-shaped pockets on the scraper body, the pockets engaging positively round the ends of the chain shackle.

In accordance with another new features of the present invention, the ends of the chain shackle are advantageously made tapered in a wedge-shaped manner in the axial direction of the threaded bolts and engage positively into the matching pockets on the scraper body. The pockets taper in a wedge-shaped manner towards the horizontal parting plane.

In accordance with still a further feature of the present invention, for providing a support perpendicularly to the chain pulling direction, the chain shackle has, at its two ends, end faces which are bevelled in a wedge-shaped manner in the axial direction of the threaded bolts. In the stressed state of the chain shackle, they bear on correspondingly inclined counterfaces in the pockets of the scraper body and thus secure the chain shackle against lateral displacement relative to the solid scraper body in a simple and extremely reliable way, without the threaded bolts being subject to shearing stress. At the same time, in the relaxed state, the chain shackle at first engages with all-round play into the U-shaped pockets on the scraper body, in order to come firmly to bear on the side walls of the pockets only with increasing clamping.

It is still another feature of the present invention that the clamp fastening is also improved by arranging the parting plane between the scraper body and chain shackle outside the center line, at least in the region of the vertical chain links, so that the vertically arranged chain links located behind the scraper can be supported fully on the scraper body at the force introduction point and do not press the scraper and chain shackle apart from one another.

A further advantage is that, by dispensing with a middle bolt located between the two strands of the double-center chain band, the scraper body acquires additional stability because the bore for the middle bolt is omitted.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
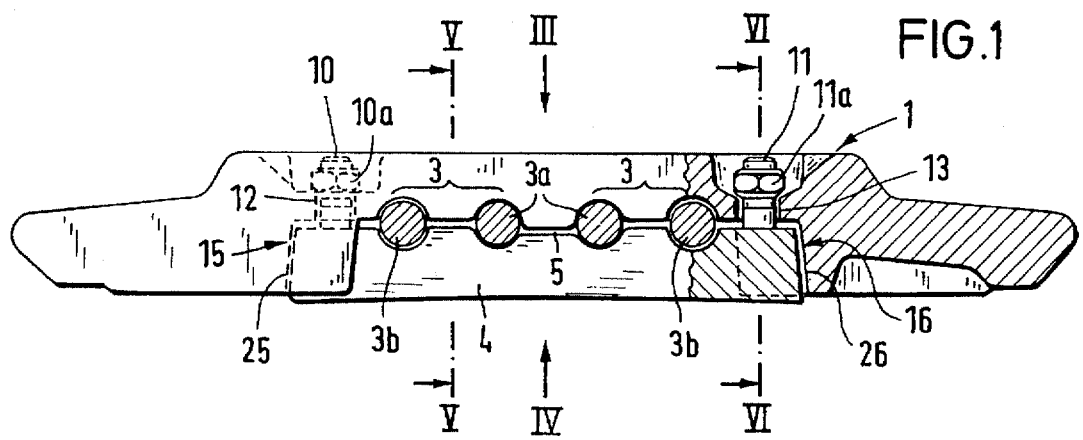
FIG. 1 shows a partially sectional front view of a scraper in accordance with the present invention, with a chain shackle at the commencement of mounting on a double-center chain band.

A scraper in accordance with the present invention for chain bands of double-center chain scraper conveyors has a solid one-part scraper body 1 which engages from above over horizontal chain links 3 of a double-center chain 2 located next to one another. It further ha a chain shackle 4 which extends along the scraper longitudinal axis and holds the chain links 3 from below.

The scraper body 1 and the chain shackle 4 are provided, on both sides of a horizontal parting plane 5, with chain beds 6, 7 (FIG. 4) and 8, 9 (FIG. 2) for receiving the legs 3a, 3b of the two horizontal chain links 3 of the double-center chain 2 which are located next to one another. The chain shackle 4 is connected to the scraper body 1 perpendicularly to the horizontal parting plane 5 and transversely to the direction of run 14 by two threaded bolts 10, 11 which are arranged outside the horizontal chain links 3 and which engage into bores 12, 13 on the scraper body 1.

Figure 2:
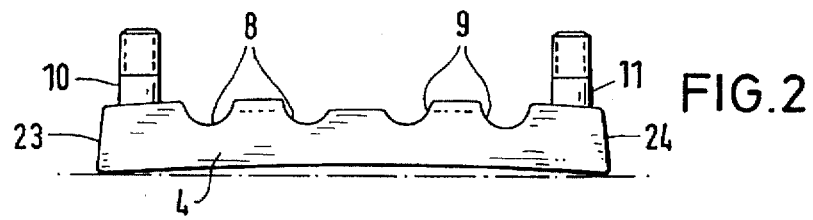
FIG. 2 shows the chain shackle in a corresponding detailed representation in the relaxed state.

As can be seen in FIG. 1 and FIG. 2, the chain shackle 4 is shaped in such a way in the direction of the scraper longitudinal axis that, during mounting with an inserted double-center chain 2, the chain shackle first comes to bear on the two inner legs 3a of the horizontal chain links 3. The legs are located towards the center of the scraper in order to clamp the inner and outer chain-link legs 3a and 3b with the same force when a defined mounting force has been achieved.

For this purpose, as shown in FIG. 1 and FIG. 2, the chain shackle 4 is curved convexly relative to the scraper longitudinal axis. Moreover, in the region of clamping, it is held positively in the direction of run 14 and transversely thereto in recesses 15, 16 on the scraper body 1.

Figure 4:
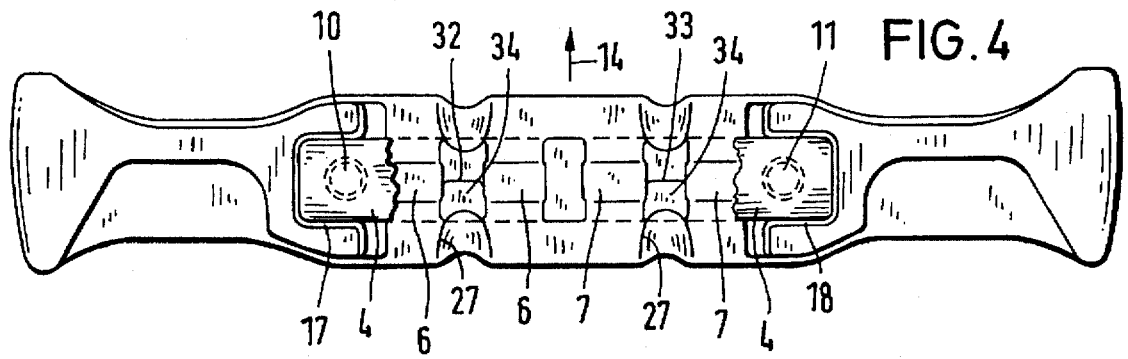
FIG. 4 shows a bottom view of the scraper in accordance with the present invention, in the direction of the arrow IV of FIG. 1, with the chain shackle represented partially cut away.
Figure 6:
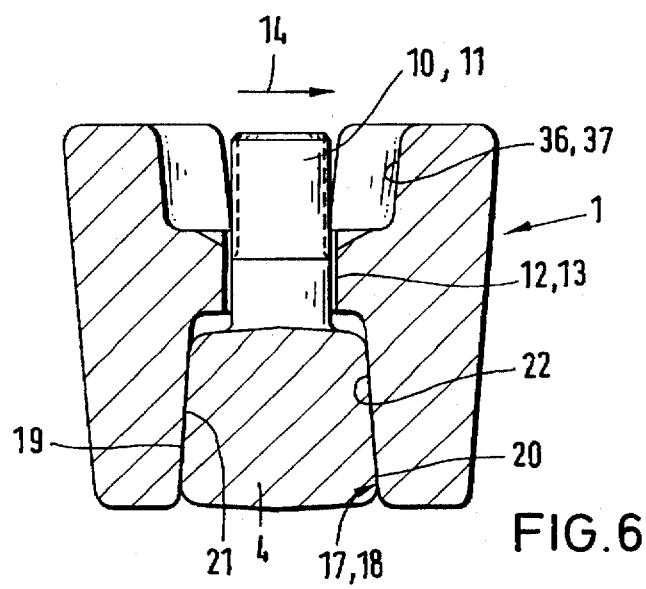
FIG. 6 shows a further section through the scraper in accordance with the present invention, in the region of one of the two threaded bolts for clamping the chain shackle to the scraper body along the section line VI—VI of FIG. 1.

As shown in detail in FIG. 1, FIG. 4 and FIG. 6, the chain shackle 4 is arranged with its two ends, in the region of the threaded bolts 10, 11, in U-shaped pockets 17, 18 on the scraper body 1. The pockets engage positively round the ends of the chain shackle 4.

In the relaxed state of FIG. 11 and FIG. 2, the chain shackle 4 first engages with all-round play into the U-shaped pockets 17, 18 on the scraper body 1. It is brought into the stretched position of FIG. 2a only as a result of the tightening of the nuts 10a, 11 seated on the two threaded bolts 10, 11 and thereby comes to bear on the side walls 19, 20 of the U-shaped pockets 17, 18, as shown in FIG. 6.

For this purpose, the ends of the chain shackle 4, on their longitudinal side faces 21, 22, are made tapered in a wedge-shaped manner in the axial direction of the threaded bolts 10, 11 and engage positively on the scraper body 1 into the matching U-shaped pockets 17, 18 tapering in a wedge-shaped manner towards the horizontal parting plane 5. The chain shackle 4 is thereby fixed immovably to the scraper body 1 both in the direction of run 14 of the chain or scraper and transversely thereto, without the threaded bolts 10, 11 being subjected to the high mechanical shearing or torsional stresses occurring under rough conveying conditions.

In addition, the chain shackle 4 has, at its two ends, end face 23, 24 which are bevelled in a wedge-shaped manner in the axial direction of the threaded bolts 10, 11 and which, in the stressed state of the chains hackle 4, bear snugly against correspondingly inclined counterfaces 25, 26 in the pockets 17, 18 of the scraper body 1.

Figure 2A:
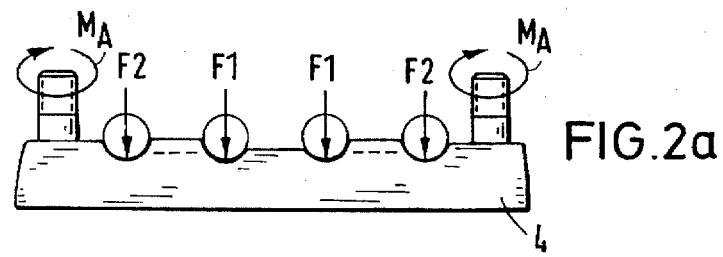
FIG. 2a shows the chain shackle after clamping on the scraper.
Figure 3:
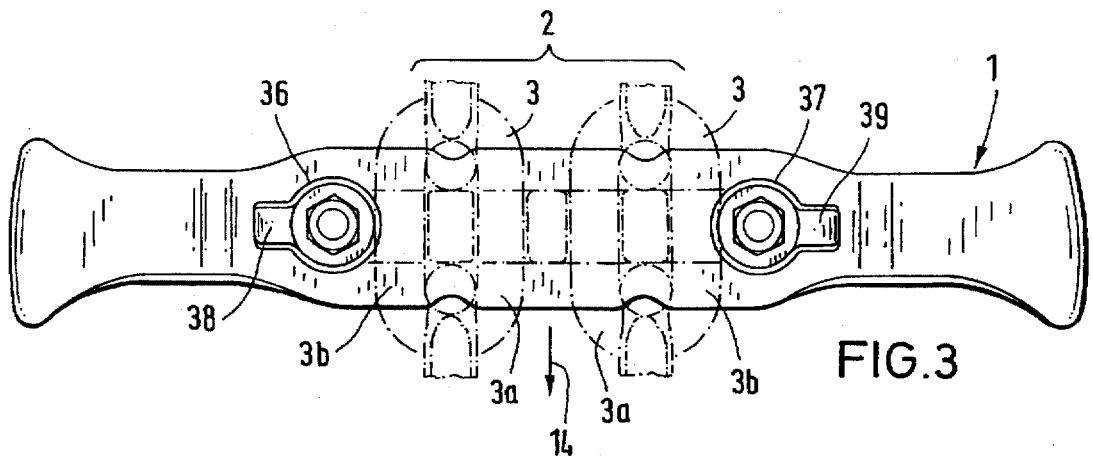
FIG. 3 shows a top view of the scraper in accordance with the present invention, in the direction of the arrow III of FIG. 1.

As the representation of FIG. 2a shows in detail, when the nuts 10a, 10b on the two threaded bolts 11 are tightened with a tightening torque $M_A$ a force F1 first acts on the middle part of the chain shackle 4 at each of the two inner legs 3a of the two chain links 3 located next to one another. Only after the complete tightening of the inner legs 3a clamped snugly in the chain beds on the scraper body 1 and on the chain shackle 4 are the two outer legs 3b of the horizontal chain links 3 also clamped in a fully positive manner with a force F2 between the scraper body 1 and chain shackle 4, until the wedge-shaped ends of the chain shackle 4 come to bear snugly and positively in the U-shaped pockets 17, 18 on the scraper body 1.

Furthermore, the mechanical stress on the chain fastening on the scraper is also reduced. This is achieved in that the horizontal parting plane 5 between the scraper body 1 and chain shackle 4 is offset downwards or shouldered in a step-like manner (FIG. 5) in the region of the vertical indentations 27 for the noses 28 of the vertical chain links 29 on the rear side of the scraper body 1, beyond the horizontal center line 30 towards the chain shackle 4, in such a way that the force introduction point 31 of the vertical chain links 29 engaging on the rear side of the scraper level with the center line 30 is located completely in the region of the scraper body 1.

Figure 5:
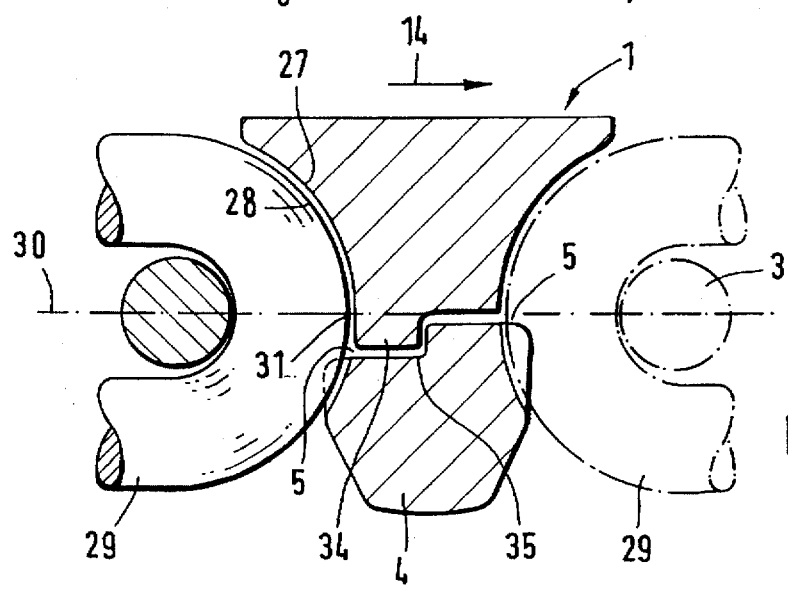
FIG. 5 shows a section through the one-part scraper in accordance with the present invention, in the region of one of the two chain beds for the double-center chain band along the section line V—V of FIG. 1.

As can be seen in the bottom view of FIG. 4 and in the sectional representation of FIG. 5, the webs 32, 33 of the chain beds 6, 7 between the legs 3a, 3b of each of the two horizontal chain links 3, projects downwards in a step-like manner towards the chain shackle 4 on the rear side of the scraper body 1. They thus form force introduction noses 34 which engage positively into corresponding rear depressions 34 on the chain shackle 4.

Finally, the dismounting of such scrapers is also improved substantially. This is achieved in that the upper recesses 36, 27 on the scraper body 1 for the nuts 10a, 11a of the threaded bolts 10, 11 of the chains hackle 4 are equipped with chisel guide slopes 38, 39 to make cleaning easier.

It will be understood that each of the elements described above, or two or more together, may also find a useful application in other types of constructions differing from the types described above.

While the invention has been illustrated and described as embodied in a scraper for chain bands of double-center chain scraper conveyors, especially in underground mining, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A scraper for chain bands of double-center chain scraper conveyors, comprising a solid one-part scraper body formed to engage from above horizontal round chain links of the double-center chain which chain links are located next to one another; a chain shackle formed to hold the chain links from below and extending in a scraper longitudinal axis, said scraper body and said chain shackle being provided, on both sides of a horizontal parting plane, with chain beds for receiving legs of the horizontal chain links, said chain shackle being connected to said scraper body perpendicularly to the horizontal parting plane and transversely to a direction of run; means for connecting said chain shackle to said scraper body, said chain shackle being curved convexly relative to the scraper longitudinal axis transversely to the chains so that during mounting with inserted double-center chain, said chain shackle first comes to bear on the two legs of the horizontal chain links located toward a center of the scraper, so that when a defined mounting force has been achieved, said chain shackle additionally clamps the chain links with approximately the same force.

2. A scraper as defined in claim 1, wherein said connecting means include two screw connections arranged outside the horizontal chain links and having threaded bolts engaging into bores on said scraper body.

3. A scraper as defined in claim 1, wherein said scraper body has recesses, said chain shackle in a region of clamping being held positively in the direction of run and transversely to the direction of run in said recesses of said scraper body.

4. A scraper as defined in claim 2, wherein said scraper body as U-shaped pockets, said chain shackle having two ends and being arranged with said two ends in a region of said threaded bolts in said U-shaped pockets of said scraper body so that said pockets engage positively around said ends of said chain shackle.

5. A scraper as defined in claim 4, wherein said ends of said chain shackle are tapered in a wedge-shaped manner in an axial direction of said threaded bolts, said pockets matching said ends of said chain shackle and tapering in a wedge-shaped manner toward said horizontal parting plane.

6. A scraper as defined in claim 4, wherein said ends of said chain shackle have end faces which are beveled in a wedge-shaped manner in an axial direction of said threaded bolts, said pockets of said scraper body having counterfaces in which, in a stressed state of said chain shackle, said end faces bear on said inclined counterfaces.

7. A scraper as defined in claim 1, wherein said chain shackle engages in a relaxed state into said U-shaped pockets of said scraper body with all-round play.

8. A scraper as defined in claim 1, wherein said scraper body has a rear side provided with vertical indentations for noses of vertical chain links, said horizontal parting plane between said scraper body and said chain shackle being offset downwardly in a region of said vertical indentations beyond a horizontal center line toward said chain shackle so that a force introduction point of the vertical chain links engaging on the rear side at a level with the center line is located completely in a region of said scraper body.

9. A scraper as defined in claim 1, wherein said chain shackle has rear depressions formed so as to receive force introduction noses formed by webs of chain beds between the legs of each of two horizontal chain links projecting downwardly in a step-like manner toward said chain shackle on a rear side of said scraper body.

10. A scraper as defined in claim 2, wherein said threaded bolts are provided with nuts, said scraper body having upper recesses which are formed for receiving said nuts of said threaded bolts and provided with chisel guide slopes.

11. A double-center chain scraper conveyor, comprising a double-center chain having horizontal round chain links located next to one another, said chain links having inner and outer legs; and a scraper having a solid one-part scraper body engaging from above over said horizontal round chain links of said double center chain, and a chain shackle holding said chain links from below and extending in a scraper longitudinal axis, said scraper body of said chain shackle being provided on both sides of a horizontal parting plane with chain beds receiving said legs of said horizontal chain links of said chain, said chain shackle being connected to said scraper body perpendicularly to said horizontal parting plane and transversely to a direction of run; means for connecting said chain shackle with said scraper body, said chain shackle being curved convexly relative to a scraper longitudinal axis transversely to said chain so that during mounting with an inserted double-center chain, said chain shackle comes to bear on said two legs of said horizontal chain links located toward the center of a scraper so that when a defined mounting force has been achieved, said chain shackle additionally clamps said inner and outer legs of said chain links with approximately the same force.

* * * * *